United States Patent
Maemura et al.

(10) Patent No.: US 8,427,023 B2
(45) Date of Patent: Apr. 23, 2013

(54) ROTOR FOR USE IN IPM ROTATING ELECTRIC MACHINE, AND IPM ROTATING ELECTRIC MACHINE PROVIDED WITH THE ROTOR

(71) Applicant: Kabushiki Kaisha Yaskawa Denki, Kitakyushu (JP)

(72) Inventors: Akihiko Maemura, Kitakyushu (JP); Kenji Tomohara, Kitakyushu (JP); Takeo Suzuki, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 13/661,128

(22) Filed: Oct. 26, 2012

(65) Prior Publication Data

US 2013/0043755 A1     Feb. 21, 2013

Related U.S. Application Data

(63) Continuation of application No. 13/004,896, filed on Jan. 12, 2011, now Pat. No. 8,319,387.

(30) Foreign Application Priority Data

Jan. 14, 2010  (JP) ................................ 2010-006278

(51) Int. Cl.
   *H02K 21/12*     (2006.01)
(52) U.S. Cl.
   USPC ................................ 310/156.53; 310/156.01
(58) Field of Classification Search . 310/156.01–156.84
   See application file for complete search history.

(56) References Cited

U.S. PATENT DOCUMENTS

| | | | |
|---|---|---|---|
| 6,525,442 B2 | 2/2003 | Senoh et al. | |
| 6,917,133 B2 | 7/2005 | Koharagi et al. | |
| 7,170,209 B2 | 1/2007 | Araki et al. | |
| 7,288,868 B2 * | 10/2007 | Tamaki et al. | 310/254.1 |
| 7,521,832 B2 * | 4/2009 | Tajima et al. | 310/156.48 |
| 7,560,842 B2 * | 7/2009 | Hattori | 310/156.53 |
| 7,719,153 B2 * | 5/2010 | Hsu | 310/156.58 |
| 7,808,143 B2 | 10/2010 | Lee et al. | |
| 7,843,101 B2 | 11/2010 | Ito et al. | |
| 7,868,501 B2 * | 1/2011 | Jonasson et al. | 310/156.53 |
| 8,008,825 B2 * | 8/2011 | Suzuki et al. | 310/156.53 |
| 8,018,109 B2 * | 9/2011 | Leonardi et al. | 310/156.53 |
| 8,067,871 B2 * | 11/2011 | Tajima et al. | 310/156.48 |
| 8,319,387 B2 * | 11/2012 | Maemura et al. | 310/156.53 |
| 2008/0258573 A1 | 10/2008 | Kamiya | |

FOREIGN PATENT DOCUMENTS

JP     2006-254629     9/2006

* cited by examiner

*Primary Examiner* — Thanh Lam
(74) *Attorney, Agent, or Firm* — Ditthavong Mori & Steiner, P.C.

(57) ABSTRACT

A rotor includes a rotor core; and first and second permanent magnets arranged in the core such that each of the first magnets corresponds to one of the second magnets and, on a cross-sectional plane of the rotor core perpendicular to a rotation axis thereof, a first line passing through the first magnet and a second line passing through the second magnet meet at a point pointing toward the rotation axis. The first and second magnets are arranged such that a straight line interconnecting the rotation axis and the point is interposed therebetween, an angle of the first magnet relative to the straight line being smaller than that of the second magnet relative to the straight line, and a width of the first magnet in the direction parallel to the first line being smaller than that of the second magnet in the direction parallel to the second line.

11 Claims, 5 Drawing Sheets

ROTOR FOR USE IN IPM ROTATING ELECTRIC MACHINE, AND IPM ROTATING ELECTRIC MACHINE PROVIDED WITH THE ROTOR

CROSS-REFERENCES TO RELATED APPLICATIONS

This application is a continuation application of pending U.S. application Ser. No. 13/004,896, filed on Jan. 12, 2011, which claims priority to Japanese Patent Application No. 2010-006278, filed on Jan. 14, 2010.

FIELD OF THE INVENTION

The present invention relates to a rotor for use in an IPM (interior permanent magnet) rotating electric machine and an IPM rotating electric machine provided with the rotor. Further, the present invention relates to a motor vehicle, a lifting machine, a fluid machine and a processing machine provided with the IPM rotating electric machine.

BACKGROUND OF THE INVENTION

Japanese Patent Application Publication No. 2006-254629 discloses one example of an IPM rotating electric machine in which permanent magnets are embedded in a rotor core and in which electric energy is converted to mechanical energy by use of magnet torque and reluctance torque.

In such a conventional IPM rotating electric machine, a plurality of permanent magnets are arranged so that two corresponding permanent magnets define the letter V whose apex points toward the rotation axis of the rotor. The two corresponding permanent magnets form a single magnetic pole. The two corresponding permanent magnets have a same shape and are arranged symmetrically to each other with respect to a straight line radially extending through the apex of the letter V and the rotation axis. In other words, in a section view perpendicular to the rotation axis, the two corresponding permanent magnets are equal to each other in the length (width) parallel to the corresponding side of the letter V, the length (thickness) perpendicular to the corresponding side of the letter V and the angle with respect to the straight line.

SUMMARY OF THE INVENTION

In accordance with a first aspect of the present invention, there is provided a rotor including: a rotor core having a rotation axis; and first permanent magnets and second permanent magnets arranged in the rotor core such that each of the first permanent magnets corresponds to one of the second permanent magnets and, on a cross-sectional plane of the rotor core perpendicular to the rotation axis, a first line passing through said each of the first permanent magnets in an extension direction thereof and a second line passing through said one of the second permanent magnets in an extension direction thereof meet at a point pointing toward the rotation axis, said each of the first permanent magnets and said one of the second permanent magnets cooperating to form a single magnetic pole. Each of the first permanent magnets and said one of the second permanent magnets are arranged on the cross-sectional plane of the rotor core such that a straight line interconnecting the rotation axis and the point is interposed therebetween, an angle of said each of the first permanent magnets relative to the straight line being smaller than an angle of said one of the second permanent magnets relative to the straight line, and a width of said each of the first permanent magnets in the direction parallel to the first line being smaller than a width of said one of the second permanent magnets in the direction parallel to the second line.

In accordance with a second aspect of the present invention, there is provided an IPM (interior permanent magnet) rotating electric machine including: a stator core; stator windings provided in the stator core; a rotor core having a rotation axis and an outer circumference surrounded by the stator core; and first permanent magnets and second permanent magnets arranged in the rotor core such that each of the first permanent magnets corresponds to one of the second permanent magnets and, on a cross-sectional plane of the rotor core perpendicular to the rotation axis, a first line passing through said each of the first permanent magnets in an extension direction thereof and a second line passing through said one of the second permanent magnets in an extension direction thereof meet at a point pointing toward the rotation axis, said each of the first permanent magnets and said one of the second permanent magnets cooperating to form a single magnetic pole. Each of the first permanent magnets and said one of the second permanent magnets are arranged on the cross-sectional plane of the rotor core such that a straight line interconnecting the rotation axis and the point is interposed therebetween, an angle of said each of the first permanent magnets relative to the straight line being smaller than an angle of said one of the second permanent magnets relative to the straight line, and a width of said each of the first permanent magnets in the direction parallel to the first line being smaller than a width of said one of the second permanent magnets in the direction parallel to the second line.

In accordance with a third aspect of the present invention, there is provided a motor vehicle in which the IPM rotating electric machine is used as a drive motor.

In accordance with a fourth aspect of the present invention, there is provided a motor vehicle in which the IPM rotating electric machine is used as a generator.

In accordance with a fifth aspect of the present invention, there is provided a lifting machine in which the IPM rotating electric machine is used as a drive motor.

In accordance with a sixth aspect of the present invention, there is provided a fluid machine in which the IPM rotating electric machine is used as a drive motor.

In accordance with a seventh aspect of the present invention, there is provided a processing machine in which the IPM rotating electric machine is used as a drive motor.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Embodiments of the present invention will now be described with reference to the accompanying drawings which form a part hereof.

(First Embodiment)

Figure 1:
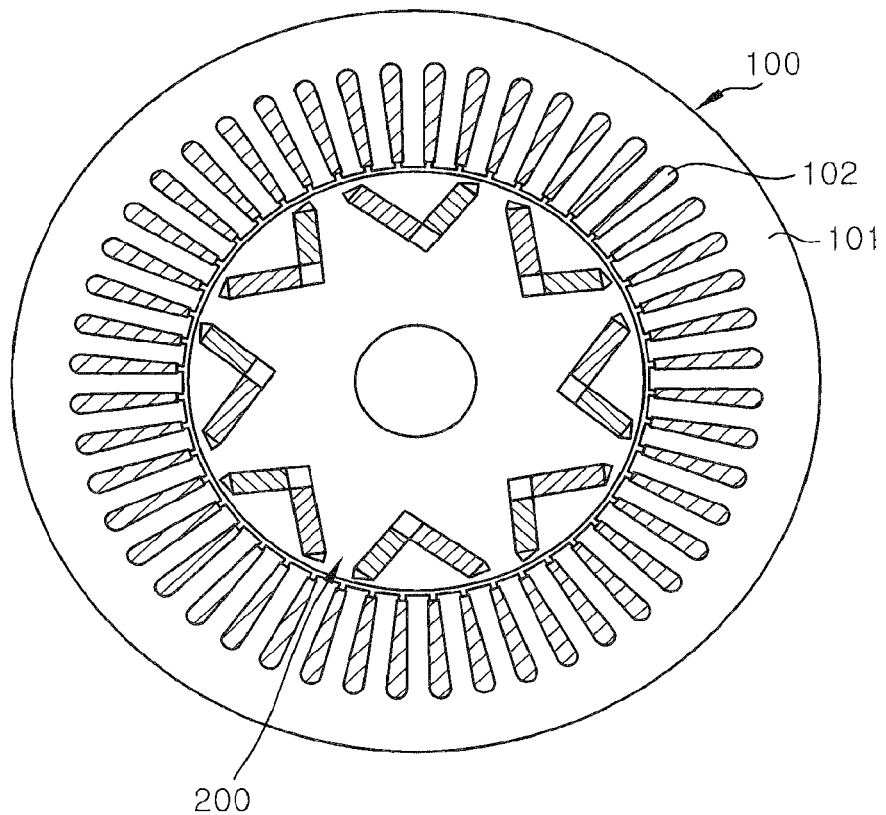
FIG. 1 is a section view showing an IPM rotating electric machine in accordance with a first embodiment of the present invention.
Figure 2:
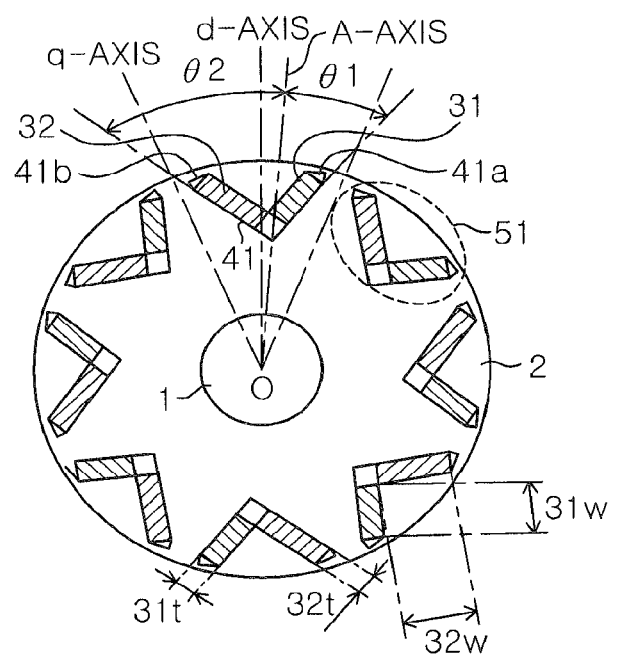
FIG. 2 is a section view showing a rotor employed in the electric machine of the first embodiment.
Figure 3:
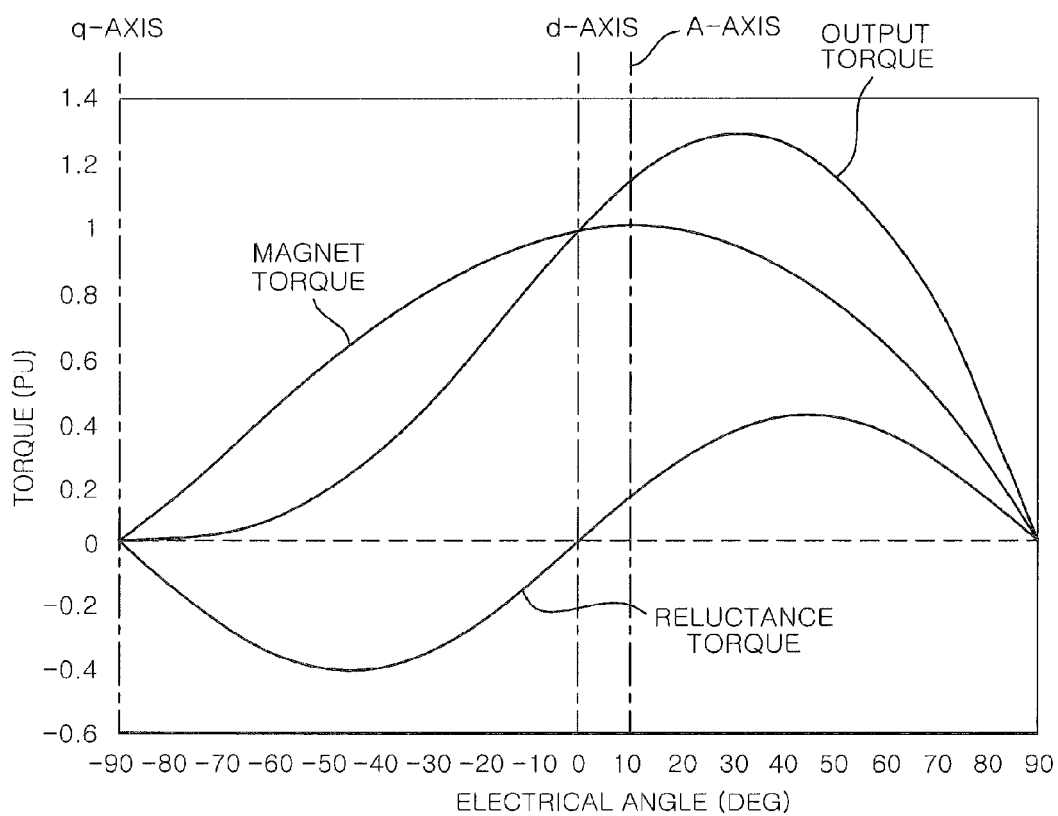
FIG. 3 is a graph representing torque curves available in the electric machine of the first embodiment.

FIG. 1 is a section view showing an IPM (interior permanent magnet) rotating electric machine in accordance with the first embodiment of the present invention. FIG. 2 is a section view showing a rotor employed in the electric machine of the first embodiment. The sections shown in FIGS. 1 and 2 are taken along a plane perpendicular to the rotation axis of the rotor. FIG. 3 is a graph representing torque curves available in the electric machine of the first embodiment.

Figure 6:
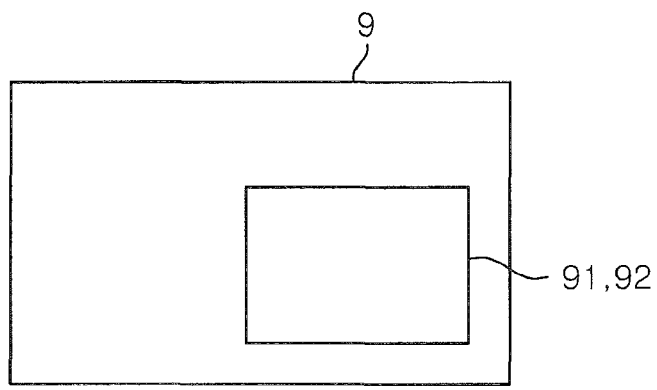
FIG. 6 is a block diagram schematically showing an industrial energy-saving machine including the IPM rotating electric machine.

The IPM rotating electric machine of the present embodiment is used as a drive motor 91 or a generator 92 in industrial energy-saving machines 9, e.g., a motor vehicle (such as a hybrid car, a fuel cell car or an electric vehicle), a lifting machine (such as a crane, a hoist, an elevator or a three-dimensional parking facility), a fluid machine (such as a compressor, a blower or a pump for pneumatic or hydraulic purposes) and a processing machine (such as a semiconductor manufacturing apparatus or a machine tool) as shown in FIG. 6.

Further, the IPM rotating electric machine of the present embodiment is also used as a drive motor for driving wheels of the motor vehicle Referring to FIG. 1, the electric machine of the present embodiment includes a stator 100 and a rotor 200. The stator 100 includes a stator core 101 and stator windings 102 and surrounds the outer circumference of the rotor 200. The stator windings 102 are provided within the slots formed in the stator core 101.

As shown in FIG. 2, the rotor 200 includes a shaft 1, a rotor core 2, first permanent magnets 31 and second permanent magnets 32. The rotor core 2 is fixed to the outer circumference of the shaft 1. V-shaped magnet holes 41, each of which has a first wing portion 41a, a second wing portion 41b and an apex pointing toward the rotation axis O of the shaft 1, are formed in the rotor core 2. Each of the first permanent magnets 31 is arranged in the first wing portion 41a of each of the magnet holes 41. Each of the second permanent magnets 32 is positioned in the second wing portion 41b of each of the magnet holes 41. On the sectional plane of the rotor core 2 perpendicular to the rotation axis O, the first permanent magnets 31 and the second permanent magnets 32 have rectangular shapes and they are arranged so that each pair of the first and the second permanent magnet 31 and 32 defines first and second sides of the letter V whose apex points toward the rotation axis O. If a straight line extending radially to interconnect the rotation axis O and the apex of each of the V-shaped magnet holes 41 is assumed to be an A-axis, each of the first permanent magnets 31 and each of the second permanent magnets 32 corresponding to each other are arranged with the A-axis interposed therebetween. The first permanent magnet 31 and the second permanent magnet 32 corresponding to each other forms a single magnetic pole 51. A desired number of magnetic poles 5 are arranged in the rotor core 2 at an equal interval along the circumferential direction. In the embodiment illustrated in FIG. 2, the number of the magnetic poles 51 is eight.

In the present embodiment, the energy product of the first permanent magnets 31 is set equal to the energy product of the second permanent magnets 32. On the sectional plane of the rotor core 2, the length (thickness) 31t of each of the first permanent magnets 31 in the direction perpendicular to the extension direction of the first side of the letter V defined by the first permanent magnet 31 is set equal to the length (thickness) 32t of each of the second permanent magnets 32 in the direction perpendicular to the extension direction of the second side of the letter V defined by the second permanent magnet 32.

On the sectional plane of the rotor core 2, the length (width) 31w of each of the first permanent magnets 31 in the direction parallel to the extension direction of the first side of the letter V defined by the first permanent magnet 31 is set smaller than the length (width) 32w of each of the second permanent magnets 32 in the direction parallel to the extension direction of the second side of the letter V defined by the second permanent magnet 32. Each of the first permanent magnets 31 and each of the second permanent magnets 32 corresponding to each other are arranged to satisfy the relationship of $\theta 2 > \theta 1$, where $\theta 1$ denotes the angle between the long side of the first permanent magnet 31 and the A-axis and $\theta 2$ denotes the angle between the long side of the second permanent magnet 32 and the A-axis.

Figure 7:
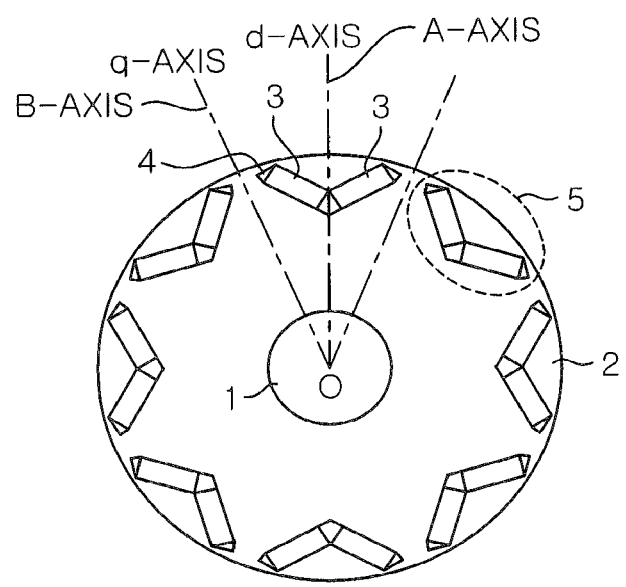
FIG. 7 is a section view showing a rotor used in a comparative IPM rotating electric machine.
Figure 8:
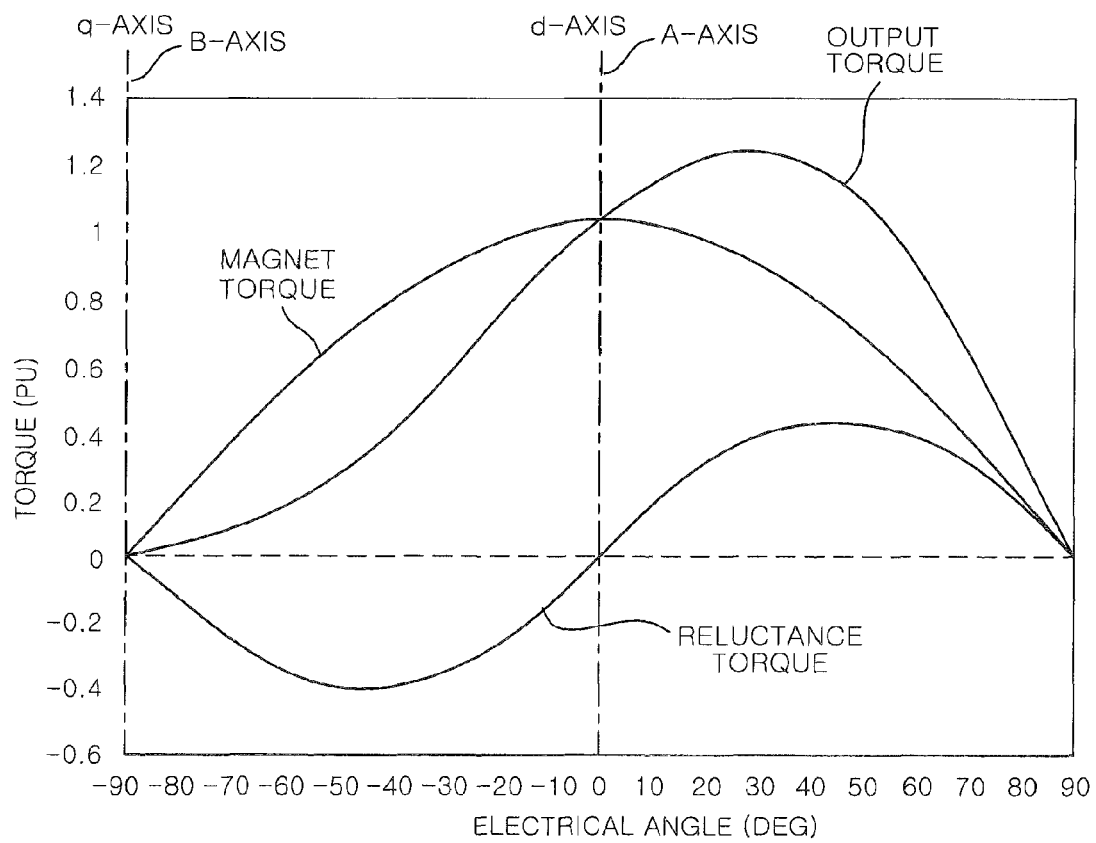
FIG. 8 is a graph representing torque curves available in the comparative IPM rotating electric machine.

Here, a comparative example will be described with reference to FIGS. 7 and 8. FIG. 7 is a section view showing a comparative IPM rotating electric machine. The section shown in FIG. 7 is taken along a plane perpendicular to the rotation axis of a rotor.

As shown in FIG. 7, in the comparative example, V-shaped magnet holes 4 whose apex points toward the rotation axis O of the shaft 1 are formed in a rotor core 2. Permanent magnets 3 are arranged in the respective portions making up the V-shaped wings of the magnet holes 4 (namely, the respective wing portions of the magnet holes 4). If a straight line extending radially to interconnect the rotation axis O (rotation center) and the apex of each of the V-shaped magnet holes 4 is assumed to be an A-axis, the two permanent magnets 3 accommodated in the wings of each of the V-shaped magnet holes 4 are arranged symmetrically to each other with respect to the A-axis and define together first and second sides of the letter V whose apex points toward the rotation axis O. Accordingly, on the sectional plane, the two permanent magnets 3 are equal to each other in the length (width) parallel to the corresponding side of the letter V, the length (thickness) perpendicular to the corresponding side of the letter V and the angle relative to the A-axis.

In case of the configuration noted above, the magnetic flux of basic wave in the gaps generated by the magnetic poles 5 is distributed in the form of a sine wave whose peak lies at the A-axis. The A-axis coincides with the d-axis used in d-q axis control. If a position on the rotor electrically phase-shifted 90 degrees from the A-axis is assumed to be a B-axis, the B-axis coincides the q-axis used in the d-q axis control and also coincides with the straight line that interconnects the midpoint between the circumferentially adjoining magnetic poles 5 and the rotation axis O.

FIG. 7 represents torque curves available in the comparative example. In the comparative example, if a current iq flows through the stator winding positioned on the d-axis, magnet torque is generated between the stator windings and the magnetic flux formed by the magnetic poles 5. Reluctance torque is generated if a current −id flows through the stator winding positioned on the q-axis. Maximum output torque can be obtained by allowing a current to flow through the stator winding arranged in the position where the resultant torque of the magnet torque and the reluctance torque becomes greatest.

On the other hand, the arrangement of the first permanent magnets 31 and the second permanent magnets 32 in accordance with the present embodiment generates a deviation in the distributions of the magnetic flux formed by the first permanent magnets 31 and the second permanent magnets in the gaps between the stator 100 and the rotor 200. Therefore, as illustrated in FIG. 3, it is possible to generate a phase difference between the A-axis where the magnetic flux becomes greatest and the d-axis which is shifted from the q-axis by an electrical angle of 90 degrees, consequently shifting the A-axis toward the maximum reluctance torque side. This makes it possible to increase the output torque as can be seen in FIG. 3 as compared with the output torque of the comparative IPM rotating electric machine shown in FIG. 8.

While the first and second permanent magnets 31 and 32 have a rectangular cross-sectional shape in the embodiment shown in FIGS. 1 and 2, the present invention is not limited thereto. Alternatively, the cross-sectional shape of the first and second permanent magnets 31 and 32 may be, e.g., a square shape, an elliptical shape or an arc shape. In this case, the θ1 denotes the angle between the A-axis and an axis parallel to the width direction of the first permanent magnet 31 and the θ2 denotes the angle between the A-axis and an axis parallel to the width direction of the first permanent magnet 32.

(Second Embodiment)

Figure 4:
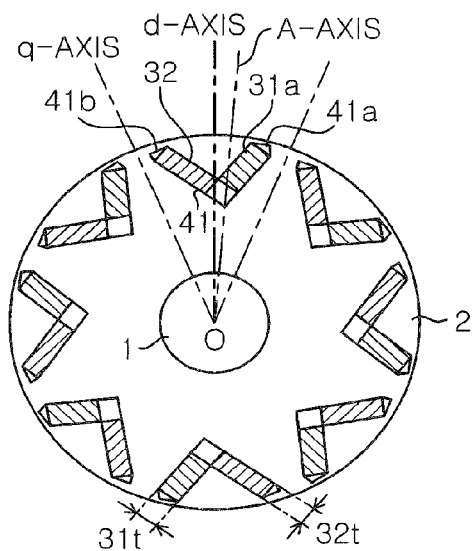
FIG. 4 is a section view showing a rotor for use in an IPM rotating electric machine in accordance with a second embodiment of the present invention.

FIG. 4 is a section view showing a rotor for an IPM rotating electric machine in accordance with the second embodiment of the present invention. The second embodiment differs from the first embodiment in that the thickness of each of the first permanent magnets 31 (the length of each of the first permanent magnets 31 in the direction perpendicular to the extension direction of the first side of the letter V defined by the first permanent magnet 31) is set greater than the thickness of each of the second permanent magnets 32 (the length of each of the second permanent magnets 32 in the direction perpendicular to the extension direction of the second side of the letter V defined by the second permanent magnet 32). The same components as those of the first embodiment shown in FIG. 2 are designated by like reference numerals in FIG. 4 and redundant description thereof will be omitted. Hereinafter, the first permanent magnets whose thickness is greater than that of the second permanent magnets 32 are designated by reference numeral 31$a$ and the rotor of the second embodiment will be described with emphasis placed on the points differing from the first embodiment.

The operating point of the first permanent magnets 31$a$ is lower than that of the second permanent magnets 32 because the width 31$w$ of each of the first permanent magnets 31$a$ is set smaller than the width 32$w$ of each of the second permanent magnets 32 as in the rotor shown in FIG. 2. For that reason, the density of the magnetic flux formed by the first permanent magnets 31$a$ tends to become lower than the density of the magnetic flux formed by the second permanent magnets 32. However, since the thickness 31$t$ of the first permanent magnets 31$a$ is set greater than the thickness 32$t$ of the second permanent magnets 32, it is possible to increase the operating point of the first permanent magnets 31$a$ and hence the density of the magnetic flux formed by the first permanent magnets 31$a$. This makes it possible to generate a greater deviation in the distributions of the magnetic flux formed by the first permanent magnets 31$a$ and the second permanent magnets 32 in the gaps between the stator 100 and the rotor 200 as compared with the first embodiment. As a result, it is possible to further increase the phase difference between the A-axis and the d-axis, thereby further increasing the output torque as compared with the first embodiment.

(Third Embodiment)

Figure 5:
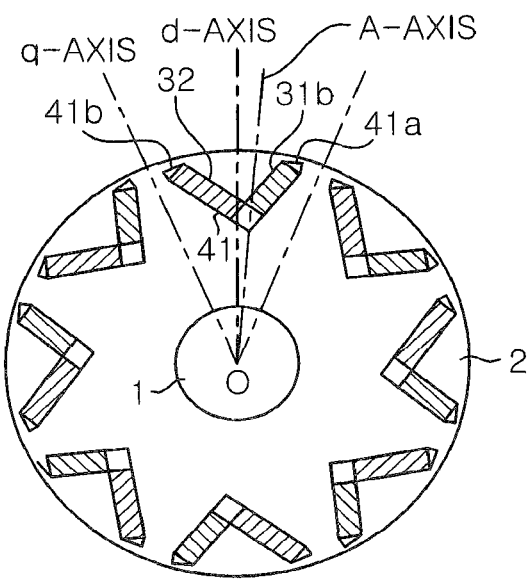
FIG. 5 is a section view showing a rotor for use in an IPM rotating electric machine in accordance with a third embodiment of the present invention.

FIG. 5 is a section view showing a rotor for an IPM rotating electric machine in accordance with the third embodiment of the present invention. The third embodiment differs from the first embodiment in that the energy product of the first permanent magnets 31 is set greater than the energy product of the second permanent magnets 32. The same components as those of the first embodiment shown in FIG. 2 are designated by like reference numerals in FIG. 5 and will be omitted from description. Hereinafter, the first permanent magnets whose energy product is greater than that of the second permanent magnets 32 are designated by reference numeral 31$b$ and the rotor of the third embodiment will be described with emphasis placed on the points differing from the first embodiment.

The operating point of the first permanent magnets 31$b$ is lower than that of the second permanent magnets 32 because the width 31$w$ of each of the first permanent magnets 31$a$ is set smaller than the width 32$w$ of each of the second permanent magnets 32 as in the rotor shown in FIG. 2. For that reason, the density of the magnetic flux formed by the first permanent magnets 31$b$ tends to become lower than the density of the magnetic flux formed by the second permanent magnets 32. However, since the product of energy of the first permanent magnets 31$b$ is set greater than the product of energy of the second permanent magnets 32, it is possible to increase the density of the magnetic flux formed by the first permanent magnets 31$b$. This makes it possible to generate a greater deviation in the distributions of the magnetic flux formed by the first permanent magnets 31$b$ and the second permanent magnets 32 in the gaps between the stator 100 and the rotor 200 as compared with the first embodiment. As a result, it is possible to further increase the phase difference between the A-axis and the d-axis, thereby increasing the output torque as compared with the first embodiment.

In the embodiments described above, the second embodiment and the third embodiment have been separately described, the combination thereof may be possible.

The IPM rotating electric machine of the present invention is capable of generating high output power and can be used as a drive motor or a generator in industrial energy-saving machines, e.g., a motor vehicle, a lifting machine, a fluid machine and a processing machine. While the invention has been shown and described with respect to the embodiments, it will be understood by those skilled in the art that various changes and modification may be made without departing from the scope of the invention as defined in the following claims.

What is claimed is:

1. A rotor, comprising:
a rotor core having a rotation axis; and
first permanent magnets and second permanent magnets arranged in the rotor core such that each of the first permanent magnets corresponds to one of the second permanent magnets and, on a cross-sectional plane of the rotor core perpendicular to the rotation axis, a first line passing through said each of the first permanent magnets in an extension direction thereof and a second line passing through said one of the second permanent magnets in an extension direction thereof meet at a point pointing toward the rotation axis, said each of the first permanent magnets and said one of the second permanent magnets cooperating to form a single magnetic pole, wherein said each of the first permanent magnets and said one of the second permanent magnets are arranged on the cross-sectional plane of the rotor core such that a straight line interconnecting the rotation axis and the point is interposed therebetween, an angle of said each of the first permanent magnets relative to the straight line being smaller than an angle of said one of the second permanent magnets relative to the straight line, and a width of said each of the first permanent magnets in the direction parallel to the first line being smaller than a width of said one of the second permanent magnets in the direction parallel to the second line.

2. The rotor of claim 1, wherein, on the cross-sectional plane of the rotor core, the thickness of said each of the first permanent magnets in the direction perpendicular to the first line is greater than the thickness of said one of the second permanent magnets in the direction perpendicular to the second line.

3. The rotor of claim 1, wherein the energy product of the first permanent magnets is greater than the energy product of the second permanent magnets.

4. An IPM (interior permanent magnet) rotating electric machine, comprising:
   a stator core;
   stator windings provided in the stator core;
   a rotor core having a rotation axis and an outer circumference surrounded by the stator core; and
   first permanent magnets and second permanent magnets arranged in the rotor core such that each of the first permanent magnets corresponds to one of the second permanent magnets and, on a cross-sectional plane of the rotor core perpendicular to the rotation axis, a first line passing through said each of the first permanent magnets in an extension direction thereof and a second line passing through said one of the second permanent magnets in an extension direction thereof meet at a point pointing toward the rotation axis, said each of the first permanent magnets and said one of the second permanent magnets cooperating to form a single magnetic pole, wherein said each of the first permanent magnets and said one of the second permanent magnets are arranged on the cross-sectional plane of the rotor core such that a straight line interconnecting the rotation axis and the point is interposed therebetween, an angle of said each of the first permanent magnets relative to the straight line being smaller than an angle of said one of the second permanent magnets relative to the straight line, and a width of said each of the first permanent magnets in the direction parallel to the first line being smaller than a width of said one of the second permanent magnets in the direction parallel to the second line.

5. The machine of claim 4, wherein, on the cross-sectional plane of the rotor core, the thickness of said each of the first permanent magnets in the direction perpendicular to the first line being greater than the thickness of said one of the second permanent magnets in the direction perpendicular to the second line.

6. The machine of claim 4, wherein the energy product of the first permanent magnets is greater than the energy product of the second permanent magnets.

7. A motor vehicle in which the IPM rotating electric machine of claim 4 is used as a drive motor.

8. A motor vehicle in which the IPM rotating electric machine of claim 4 is used as a generator.

9. A lifting machine in which the IPM rotating electric machine of claim 4 is used as a drive motor.

10. A fluid machine in which the IPM rotating electric machine of claim 4 is used as a drive motor.

11. A processing machine in which the IPM rotating electric machine of claim 4 is used as a drive motor.

* * * * *